United States Patent [19]

Frush

[11] 4,269,452
[45] May 26, 1981

[54] SPOKE WHEEL ASSEMBLY

[76] Inventor: Donald R. Frush, 1704 E. Sheridan, Warsaw, Ind. 46580

[21] Appl. No.: 85,698

[22] Filed: Oct. 17, 1979

[51] Int. Cl.³ .............................................. B60B 1/06
[52] U.S. Cl. .................................... 301/6 R; 301/67; 301/80; 29/159.03; 188/19
[58] Field of Search ........... 301/7, 6 WB, 6 R, 79–80, 301/82–85, 99, 104, 105 R, 105 B, 105 S, 54, 58, 59, 67, 72; 16/45; 188/2 R, 9, 19, 22; 29/159.03, 159.1, 159.3; 474/902

[56] References Cited

U.S. PATENT DOCUMENTS

| 818,175 | 4/1906 | Howe et al. | 301/58 |
| 886,565 | 5/1908 | Williams et al. | 301/99 |
| 1,196,408 | 8/1916 | Vestine | 301/105 R |
| 1,618,813 | 2/1927 | Charter | 152/381.3 |
| 3,608,971 | 9/1971 | Seibold | 301/58 |
| 4,084,663 | 4/1978 | Haley | 188/19 |

FOREIGN PATENT DOCUMENTS 3077 of 1913 United Kingdom ..................... 301/104

*Primary Examiner*—H. Grant Skaggs
*Attorney, Agent, or Firm*—Marmaduke A. Hobbs

[57] ABSTRACT

A spoked wheel and method for assembling the same in which formed sheet metal spokes are disposed between the rim and hub and are attached to each by portions on the spoke which are bent over and crimped on the side portions of the rim and the hub bushing. The ends of the rim are held together by one of the spokes, which is crimped over the junction of the rim ends, thus requiring no riveting or welding of the rim ends. A semi-pneumatic tire is mounted on the rim and assists in holding the crimped portions of the spoke in place on the rim. The wheel bearings are press fitted into the hub bushing and secure the crimped ends of the spokes in place on the hub. In the method of making the spoked wheel, the rim is bent into an annular shape and the rim ends are brought into close proximity. One spoke is secured to the rim at the junction point of the rim ends and holds the ends in that position. The remainder of the spokes are positioned around the rim and secured thereto by bending tab portions over the sides of the rim. A hub bushing is located centrally in the rim, and the spokes are secured thereto by bending tabs over the ends and into the hub. Bearings are press fitted into the hub, and the tire is mounted on the rim to complete the assembly of the spoked wheel.

12 Claims, 9 Drawing Figures

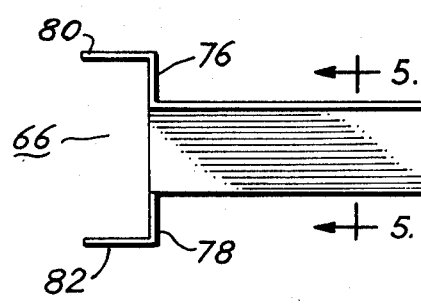
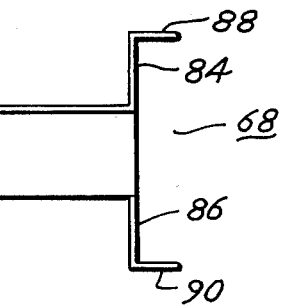
FIG. 3
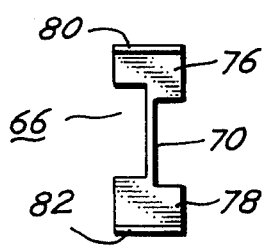
FIG. 4
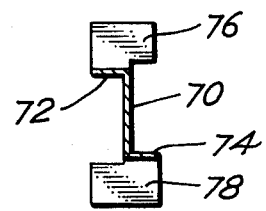
FIG. 5
FIG. 6
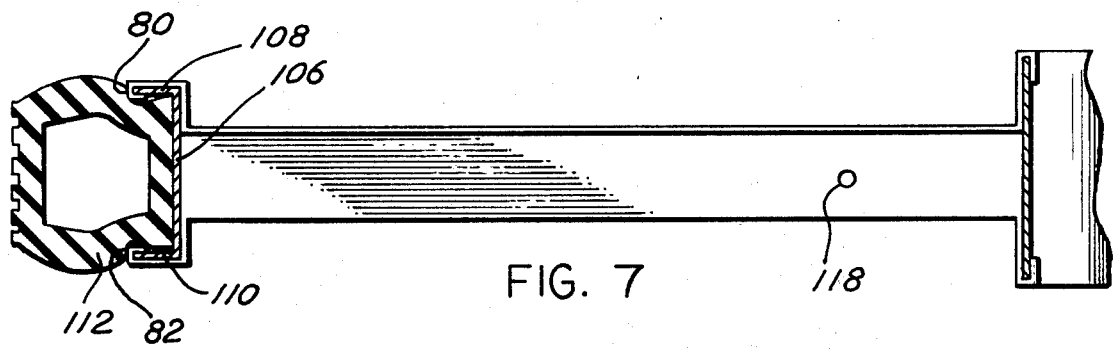
FIG. 7
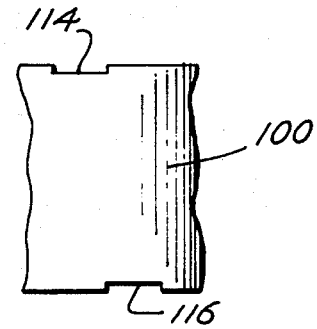
FIG. 8
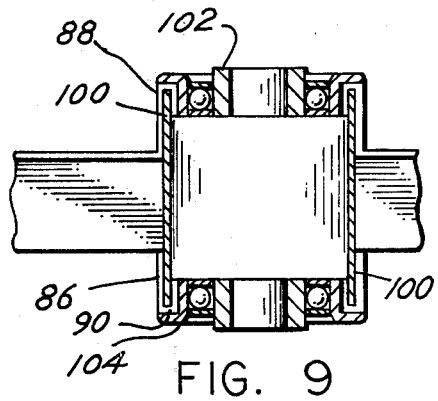
FIG. 9

SPOKE WHEEL ASSEMBLY

Spoked wheels are used extensively on lightweight implements which use wheels generally larger than 12 inches in diameter, and on which solid or stamped wheels would be excessively heavy. Common applications for spoked wheels include lawn and garden carts and implements, toys, bicycles, buggies, and lawn mowers which use large rear wheels for ease in pushing. The spoked wheels, when used on such implements, provides sufficient support for a moderately heavy load but substantially reduces excessive weight because of the large expanses of open areas in the wheel structure. For hand propelled implements such as lawn mowers and garden carts, reduced weight is an essential factor in the ease of operation of the implement; however, it is also necessary to provide a wheel which will give sufficient support to the load to be carried.

Conventional spoked wheels most commonly use rods or wire spokes attached by any one of a number of different methods to the rim and hub of the wheel. Some of the most common methods include forming a loop at the end of the spoke and, during assembly of the wheel, attaching the loop to a hooked portion on the hub or rim of the wheel. Another method includes the use of a threaded spoke secured to a threaded receiving element on the hub and rim. Other methods include utilizing enlarged ends on the spokes and securing slots in the rim or hub for holding the enlarged ends, or a continuous spoke element which is threaded and woven through receiving portions on the rim and hub. The spokes may also be riveted, welded, secured by bolts or screws, or otherwise attached to the rim and hub.

A principal disadvantage of conventional spoked wheels is that assembly of the wheel is complicated and requires many separate and individual operations, thus substantially adding to production costs. Typically, the rim is assembled first, being formed into an annular shape from a metal band, the ends of which are riveted or welded together. Riveting or welding of the ends is both costly and time consuming, thus substantially adding to the overall cost of manufacturing a spoked wheel. The previous spoke attachment methods have also been complicated, again requiring a substantial amount of time to perform, and therefore increasing the cost of manufacturing spoked wheels. The two steps noted above, i.e. welding or riveting of the rim and attachment of the spokes to the rim and hub, are sufficiently dissimilar, that in making a conventional spoked wheel, the wheel being assembled must be moved from one assembly point to another for completion, as different machines are needed for the various steps. This also increases the time required to produce a spoked wheel, thereby increasing the cost of the wheel. It is therefore one of the principal objects of the present invention to provide a spoked wheel which is light in weight yet has sufficient strength to support implements, such as lawn equipment and the like, commonly using conventional spoked wheels, and which can be faster and more efficiently assembled than the conventional spoked wheels, thereby resulting in lower production costs for the wheel.

Another object of the present invention is to provide a spoked wheel which requires no welding or riveting of the ends of the material to form the rim, and which, when fully assembled, is self supporting, the spokes being secured in their assembled positions by the tire on the rim and the bearings in the hub, thus eliminating the need to weld, rivet or bolt the spokes in place.

Still another object of the invention is to provide a spoked wheel in which the spokes are of sheet metal construction and having integral fixtures at the inner and outer ends for attaching the spokes to the hub and rim, respectively, and which is simple in construction and can readily be assembled using standard metal fabricating equipment.

A further object of the present invention is to provide a spoked wheel which can be constructed in a variety of sizes with an even or an odd number of spokes thereon, and which can incorporate efficient braking devices to hold the wheels in a secured position, thereby preventing accidental movement of the device on which the wheel is mounted.

An additional object of the present invention is to provide a method for assembling a spoked wheel embodying the aforementioned advantages, which is easy to perform, thus resulting in substantial savings in time and money during assembly of the wheel.

Further objects and advantages of the present invention will become apparent from the following detailed description and the accompanying drawings wherein:

FIG. 3 is an enlarged side elevational view of one of the spokes from the wheel shown in the preceding figures;

FIG. 4 is an end elevational view of the rim attachment end of the spoke shown in FIG. 3;

FIG. 5 is a cross sectional view of the spoke shown in FIG. 3 taken on line 5—5 of the latter figure;

FIG. 6 is an end elevational view of the hub attachment end of the spoke shown in the preceding figures;

FIG. 7 is a fragmentary cross sectional view of the rim and hub shown in FIG. 2, taken on line 7—7 of the latter figure;

FIG. 8 is a fragmentary side elevational view of the hub shown in the preceding figures; and FIG. 9 is a fragmentary cross sectional view of the wheel shown in FIG. 2, taken on line 9—9 of the latter figure.

Figure 1:
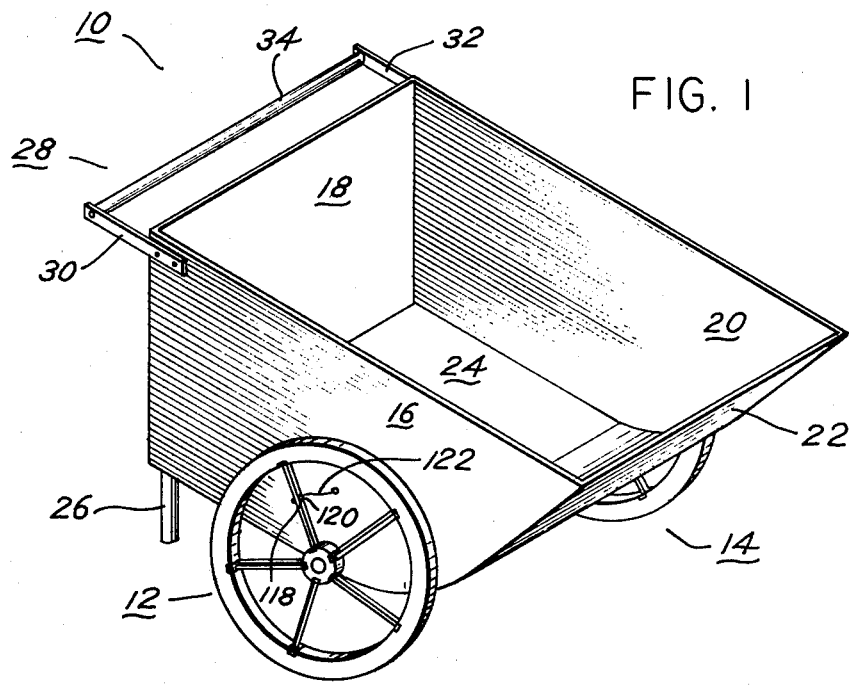
FIG. 1 is a perspective view of a lawn and garden cart on which spoked wheels of the present invention are used.
Figure 2:
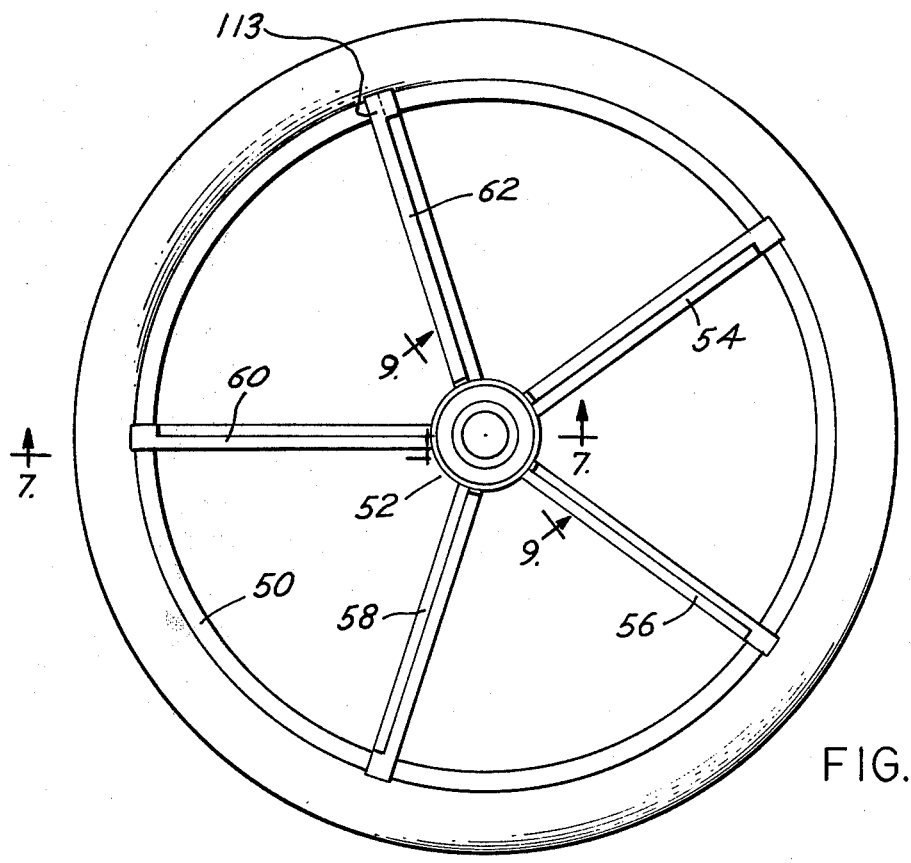
FIG. 2 is a side elevational view of one of the spoked wheels shown in FIG. 1.

Referring more specifically to the drawings, and to FIG. 1 in particular, numeral 10 designates a lawn and garden cart having spoked wheels 12 and 14 embodying the present invention mounted thereon. Spoked wheels of the new design have a wide range of possible uses, and the lawn and garden cart 10 is used for illustrative purposes only. Cart 10 has vertical wall panels 16, 18 and 20, a sloping front wall panel 22 and a bottom or floor panel 24. Support legs 26 are disposed underneath bottom panel 24 near its rear edge, and provide support so that cart 10 can stand upright. A handle 28 having side supports 30 and 32 extending rearwardly from wall panels 16 and 20, respectively, and a hand rail 34 disposed between the side supports, is grasped when the cart is to be pushed.

Each of spoked wheels 12 and 14 has a rim 50, a hub 52, and spokes 54, 56, 58, 60 and 62 disposed therebetween. Although the embodiment shown has five spokes on the wheel, more or fewer spokes may be used, depending upon the support required as well as the appearance desired for the implement on which the wheel will be used. Since each of the spokes is independently attached to the hub and rim, in the manner to be described subsequently, and is not dependent upon an opposing spoke for support or attachment, either an odd or even number of spokes may be used on a wheel of the present invention. The rim and spokes may be constructed of any suitable material, including sheet metal, such as aluminum or steel, which will provide the support, appearance and durability required for the wheel, and the material may be prefinished if desired. The spokes have a main body 64, a rim attachment 66 at one end of body 64 for securing the spoke to rim 50, and a hub attachment 68 at the opposite end of body 64 for securing the spoke to the hub. Spoke body 64, as best seen in cross section in FIG. 5, includes a central panel 70 which extends between hub attachment 68 and rim attachment 66, and is positioned so that the width of panel 70 extends parallel with the axis of hub 52. Side flanges 72 and 74 extend in opposite directions from the side edges of central panel 70 for the entire length of the panel, and supply additional support to central panel 70, thereby giving spoke body 64 a substantially rigid construction. Rim attachment 66 is integrally connected to one end of spoke body 64, and includes rim support members 76 and 78 which are placed against the inner surface of rim 50 when the wheel is assembled. Extending perpendicularly from rim support members 76 and 78 are crimp tabs 80 and 82, respectively, which, in assembly of the wheel, are used to secure the spoke to the rim by being bent around the rim as best seen in FIG. 7. At the opposite end of spoke body 64, hub attachment 68 is disposed in similar fashion to rim attachment end 66, and consists of hub support members 84 and 86 having crimp tabs 88 and 90 extending perpendicularly therefrom. Attachment 68 is attached to the hub, as best seen in FIG. 9, wherein crimp tabs 88 and 90 are bent around the ends of hub 52. Hub 52 consists of an outer sleeve or bushing 100, and bearings 102 and 104, which are press fitted therein. During assembly of the wheel, hub support members 84 and 86 are placed against the outer surface of hub bushing 100 and tabs 88 and 90 are folded over the end of the bushing 100 and crimped thereover to lie against the inner surface of the bushing. When bearings 102 and 104 are press fitted into the hub, tabs 88 and 90 are secured therein.

Rim 50 has a U-shaped configuration in cross section, consisting of an annular base 106 with side flanges 108 and 110 extending outwardly therefrom. Rim support members 76 and 78 are placed against the surface of rim base 106 which faces the interior of the wheel, and tabs 80 and 82 are folded over rim side flanges 108 and 110. A semi-pneumatic tire 112 is mounted on rim 50 and secures the tabs in place. One of the principal advantages of the present design for a spoked wheel is that when rim 50 is constructed of metal or steel, the ends of the rim need not be welded or riveted together after the rim has been formed. The spokes and tire will hold the rim together, in that one spoke will be disposed at the ends of the rim so that the crimp tabs will be folded over the junction line 113 of the two rim ends, and the tire holds the tabs firmly in place against the inside of the flanges of the rim.

In the assembly of a spoked wheel embodying the present invention, the rim is formed into an annular shape and the ends of the rim are brought into alignment with each other. The first spoke is positioned so that rim support members 76 and 78 cover the space between the ends of the rim, and crimp tabs 80 and 82 are folded along the outer surface of rim side flanges 108 and 110, and over the outer edge of the rim side flanges, and are crimped to seat against the inner surfaces of the rim flanges. Additional spokes are equally spaced around the rim and are attached to the rim in a similar fashion. As previously mentioned, various numbers of spokes may be used to provide the required support and the appearance desired. The hub bushing 100 is positioned centrally within rim 50, and hub support members 84 and 86 of the spokes are placed against the outer surface of bushing 100. Crimp tabs 88 and 90 are folded over the outer edges of bushing 100 and are crimped against the inner surface of the bushing. Bearings 102 and 104 are then press fitted into the hub, thereby securing tabs 88 and 90 against the hub.

Hub bushing 100 may be provided with notches, such as those designated by numerals 114 and 116 in FIG. 8. When these notches are provided, crimp tabs 88 and 90 will fit therein and thus provide a smooth outer edge on the bushing so that bearings 102 and 104 fit smoothly thereon. The notches also assist in preventing the spokes from slipping out of place on the hub bushing. In some applications of the present spoked wheels, bearings may not be required for mounting the shaft or axle in the wheel. In such cases plastic caps or rings may be inserted snugly in the ends of hub bushing 100 and will secure crimp tabs 88 and 90 within bushing 100. The shaft on which the wheel is to be mounted may be inserted through an opening in the cap. When the rim, spokes and hub have been assembled, the semipneumatic tire 112 is mounted on rim 50. Ideally, tire 112 will be approximately 10 percent smaller than rim 50 so that the tire will be in a slightly stretched condition when mounted on the rim. The tire holds crimp tabs 80 and 82 in place on rim 50 and, because of its smaller diameter than rim 50, tends to compress the rim and spokes toward hub 52, thus assisting in holding the wheel in proper form.

Central panel 70 of one or more of the spokes may be provided with a hole or opening 118 so that a pin 120 attached by a chain or wire 122 to the implement, may be inserted therein to prevent the wheel from turning when the implement is at rest. Thus, a form of parking brake is provided to secure the implement when not in use. Since no welding, riveting, soldering or brazing is used in the assembly of the spoked wheel, less time is required to assemble the wheel than is normally required to fabricate similar conventional wheels. Substantial cost savings are realized therefrom and the wheel of the present invention can be assembled more quickly than those of conventional designs, in that the method of attachment of the spoke to the hub and rim is greatly simplified and requires no complicated fabricating steps to secure it.

In some applications of the spoked wheel, it may be preferable to use a material other than aluminum or steel to fabricate the rim and spokes. Thus, plastic or other suitable material may be utilized to form the parts of the wheel with appropriate variations in assembly techniques, such as heating to form or bend the materials such as plastic.

Although one embodiment of the spoked wheel has been described in detail herein, various changes may be made without departing from the scope of the present invention.

I claim:

1. A spoked wheel comprising an annular rim having first and second ends held in opposed relationship and having a bottom panel and side flanges extending outwardly therefrom to form a channel in which a tire can be mounted, a hub centrally located within said annular rim for receiving a shaft on which the wheel is mounted, and a plurality of spokes attached to said hub and said annular rim, each spoke having a first crimp type attachment means for securing said spoke to said rim, a second crimp type attachment means for securing said spoke to said hub, a central panel between said first and second crimp type attachment means, and flanges on said central panel extending laterally from the edges thereof.

2. A spoked wheel as defined in claim 1 in which said first crimp type attachment means includes a rim support portion at the end of said spokes for seating against the inner surface of said bottom panel of said rim, and members at the ends of said rim support portion for bending around the outer surface of said flanges and into said channel.

3. A spoked wheel as defined in claim 2 in which said second crimp type attachment means includes a hub support portion at the end of said spokes for seating against outer surface of said hub and members at the end of said hub support portion for bending around the ends of said hub and into said hub.

4. A spoked wheel as defined in claim 3 in which said rim support portion and said hub support portion are integral with opposite ends of said central panel and said flanges.

5. A spoked wheel as defined in claim 4 in which a bearing is mounted in said hub, and said members bent into said hub are disposed between said bearing and the inner surface of said hub.

6. A spoked wheel as defined in claim 5 in which notches are disposed in the ends of said hub, and said members at the ends of said hub support portion are positioned into said notches and bent into said hub.

7. A spoked wheel as defined in claim 4 in which a hole is disposed in one of said spokes, and a pin secured to the implement on which said wheel is mounted is inserted into said hole to prevent said wheel from turning when the implement is parked.

8. A spoked wheel as defined in claim 1 in which said second crimp type attachment means includes a hub support portion at the end of said spokes for seating against the outer surface of said hub, and members at the end of said hub support portion for bending around the ends of said hub and into said hub.

9. A spoked wheel as defined in claim 8 in which a bearing is mounted in said hub, and said members bent into said hub are disposed between said bearing and the inner surface of said hub.

10. A spoked wheel as defined in claim 8 in which notches are disposed in the ends of said hub, and said members at the ends of said hub support portion are seated in said notches and bent into said hub.

11. A spoked wheel as defined in claim 1 in which one of said spokes is secured to said ends of said rim to hold said rim in an annular shape.

12. A spoked wheel as defined in claim 1 in which a tire is mounted on said rim.

* * * * *